US007561183B1

(12) United States Patent
Schaffner

(10) Patent No.: US 7,561,183 B1
(45) Date of Patent: Jul. 14, 2009

(54) MOBILE ISSUANCE OF OFFICIAL DOCUMENTS WITH BIOMETRIC INFORMATION ENCODED THEREON

(75) Inventor: Edwin K. Schaffner, Swansea, IL (US)

(73) Assignee: Unisys Corporation, Blue Bell, PA (US)

( * ) Notice: Subject to any disclaimer, the term of this patent is extended or adjusted under 35 U.S.C. 154(b) by 784 days.

(21) Appl. No.: 10/266,279

(22) Filed: Oct. 8, 2002

(51) Int. Cl.
*H04N 5/225* (2006.01)

(52) U.S. Cl. ................................................ 348/207.99

(58) Field of Classification Search ............ 348/207.99, 348/148, 158; 340/5.52, 5.53, 5.82, 5.83, 340/5.84, 539.1, 539.11, 539.12; 382/115, 382/116, 117, 118, 119, 120, 121, 122, 123, 382/124, 125, 126, 127; 713/186
See application file for complete search history.

(56) References Cited

U.S. PATENT DOCUMENTS

| | | | | |
|---|---|---|---|---|
| 5,515,042 | A * | 5/1996 | Nelson | 340/937 |
| 5,938,717 | A * | 8/1999 | Dunne et al. | 701/117 |
| 6,037,977 | A * | 3/2000 | Peterson | 348/148 |
| 6,394,356 | B1 * | 5/2002 | Zagami | 235/487 |
| 6,411,874 | B2 * | 6/2002 | Morgan et al. | 701/36 |
| 6,518,881 | B2 * | 2/2003 | Monroe | 340/539.1 |
| 6,546,119 | B2 * | 4/2003 | Ciolli et al. | 382/104 |
| 6,560,741 | B1 * | 5/2003 | Gerety et al. | 714/752 |
| 6,681,195 | B1 * | 1/2004 | Poland et al. | 702/142 |
| 6,766,039 | B1 * | 7/2004 | Al-Sheikh | 382/115 |
| 6,934,861 | B2 * | 8/2005 | Haala | 705/44 |
| 2003/0084305 | A1 * | 5/2003 | Siegel et al. | 713/186 |
| 2003/0161507 | A1 * | 8/2003 | Lawandy | 382/118 |

FOREIGN PATENT DOCUMENTS

| | | | |
|---|---|---|---|
| JP | 06052197 | A * | 2/1994 |
| JP | 2001291122 | A * | 10/2001 |

* cited by examiner

*Primary Examiner*—Justin P Misleh
(74) *Attorney, Agent, or Firm*—James E. Goepel; Robert P. Marley

(57) ABSTRACT

A system for automatically obtaining a printable photographic image of an object for a document, particularly adaptable to police traffic-ticket dispensing situations is described. A tablet computer with a stylus input display device has a video camera device associated with it that points at the object of the document, in the preferred example the object of the document being the suspect or perpetrator of the offense. Wireless communication with a printer affiliated with another computer in the police car makes printing of the ticket easy, and additional wireless connections to remote databases provides the officer at the scene with confirmation of the object's identity and additional information. The end result is a ticket or document that is self proving and can be used to confirm the identity of the holder of the document when presented. This system can also be used in transportation, commercial, and medical settings. Many additional applications for authenticating transactions of various types are described, and electronically transferable documents may be used in place of printed documents in some embodiments.

12 Claims, 4 Drawing Sheets

MOBILE ISSUANCE OF OFFICIAL DOCUMENTS WITH BIOMETRIC INFORMATION ENCODED THEREON

BACKGROUND OF THE INVENTION

1. Field of the Invention

This invention relates to the issuance of official documents with secure information incorporated thereinto, and has particular application to writing traffic tickets and the like at non-office locations by mobile official authorities, such as police.

2. Background

There may be other applications for this invention however, our first application is to solve a problem we see in law enforcement. One of the ways in which traffic tickets are validated, for example, is the use of a signature by the respondent or suspect on the ticket. The officer will typically retain a copy of the ticket which has an impression of the signature thereon and a copy will be given to the recipient both of which can be considered official documents. There are many instances in which this may not be appropriate and this invention speaks to those. The invention may have wider applicability to official documents issued by various authorities or even commercial entities whereby the documents become self-proving by virtue of the incorporation of biometric information into them.

Modern police patrol cars are presently outfitted with a great deal of high technology equipment. By providing minimal additional equipment, the requirement for paper records can also be eliminated. An example of the kind of electronic equipment included in a modern police patrol car is illustrated in U.S. Pat. No. 6,262,764 issued Jun. 17, 2001. It is common in police departments around the United States for computers and even printers to be included in patrol cars. For decades, various forms of radio communication between patrol cars and police stations have been available, and now computer systems within patrol cars can communicate directly with various back-office databases of assorted types for various purposes.

Additionally, identification cards carried by citizens have become more complex. They now contain machine-readable information in various forms and of assorted varieties along with an ordinary photograph and personal information related to the person carrying the identification. One example can be found in U.S. Pat. No. 6,224,109 issued May 1, 2001.

Nevertheless, with all of this advanced technology available to the police (and to commercial entities as well), it is typical that the receipt or official document given for a traffic citation (or even a ticket to get into a concert or get on an airplane for example) does not include readily identifiable biometric information such as a photograph, fingerprint or computer encoded and machine-readable biometric data which would self prove the document as against the individual when the individual uses the document for whatever purpose it was intended. In the case where the document is a traffic ticket, for example, it should be clear to the individual with his picture on it that there is very little opportunity for denying his presence at the scene where the ticket was issued Thus, the inclusion of a photograph and/or data taken from the individual's ID card at the scene can, if desired, substitute for a signature in a ticket-book.

Other applications to which the invention described within could enhance include border control persons screening persons coming into a nation, doctors and patient situations, aircraft and ship checking of personnel for ticketing and boarding, building entry control of building guards, delivery persons and the like. (For example a delivery person could obtain an image to augment a signature on official documents using the invention we describe in detail herein).

Therefore there is a strong need for portable biometric authentication systems and methods associated with documents and transactions that an invention of the type described herein can accommodate.

SUMMARY OF THE INVENTION

Figure 1:
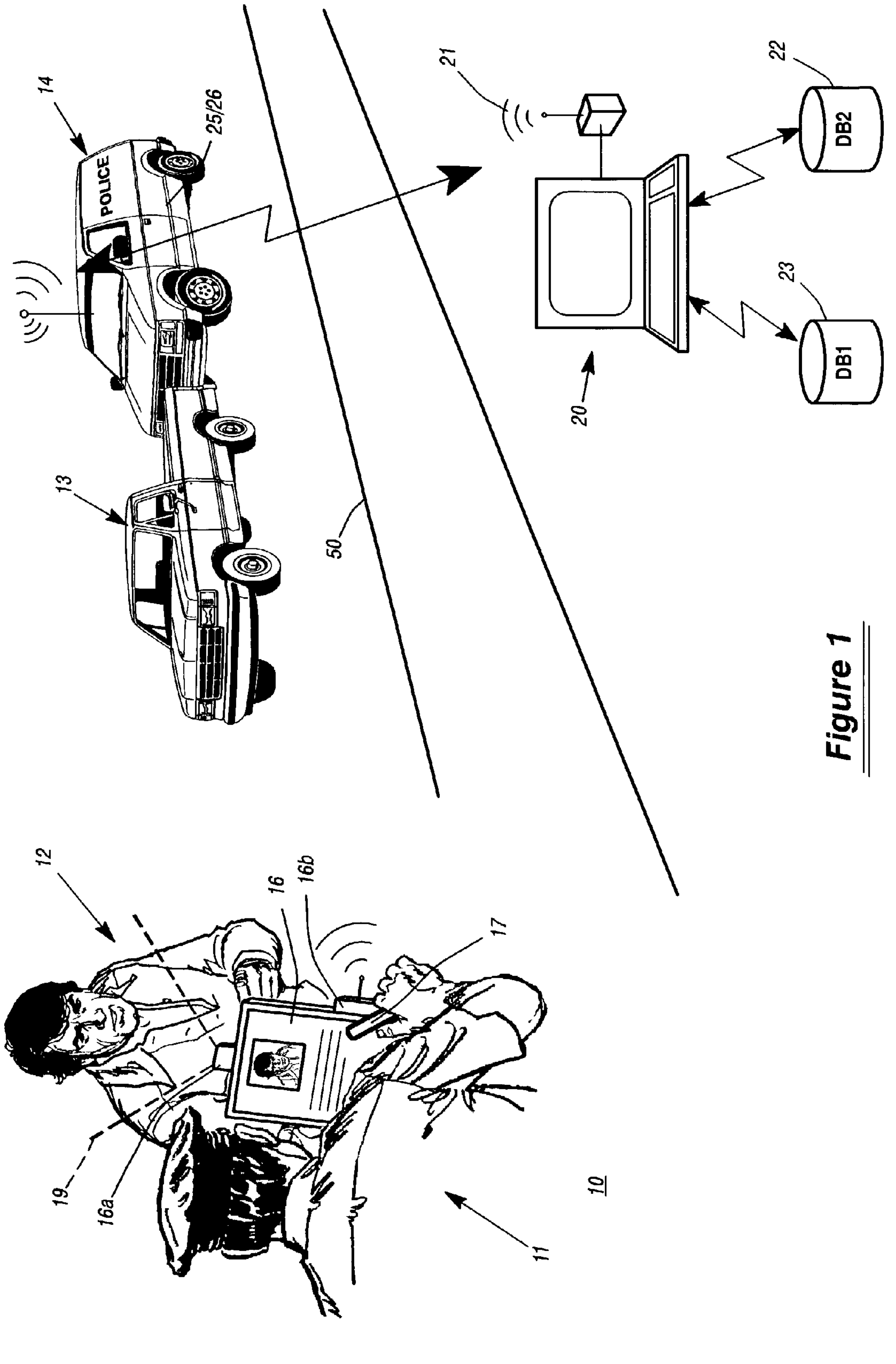
FIG. 1 illustrates an arrest scene and the interplay of the various parts of the inventive system and method of the preferred embodiments.

The invention provides a mobile system preferably employing a hand-held tablet computer with text entry capability (such as through the use of a stylus), and an imaging device associated therewith (hereinafter a camera), capable of capturing digital images of the person to whom the document should be issued. Software in the tablet computer will produce a ticket with an image on it that is taken through the use of the camera associated with the tablet computer. Alternatively, the captured biometric data (image or other biometric data) can be recorded for later use in association with the subject. This invention can have many uses and it is thought best to describe it with reference to a first embodiment, that of using it in a roadside police stop situation. The handheld computer with the associated camera preferably will drive a wireless communications port to send image data, which in the case of the police stop will be sent to a printer to print the ticket document. Preferably the printer is associated with a patrol car computer system in the scene 10 where the wireless computer tablet is used.

Additionally, biometric information available either from the user directly (including a face photograph and/or other biometric features of the individual) can be taken at the scene and sent to be reviewed against databases including suspects for various crimes. If similar devices and methods are used in the commercial world, a camera-equipped tablet computer could send data to be checked by an office computer to match individuals against credit histories and other records related to the transaction or offense under consideration. Thus, a field representative for an insurance company could issue self proving documents at the scene of a house fire or place an image of a house on the policy issued in the field.

The invention could be used in the medical world too. One use could be to match patients against their pharmaceutical prescription before dispensing a drug. For this use the doctor could issue prescriptions using the inventive system so that the prescription issues with the patient picture on it, for example, thus reducing the opportunity for fraud. Also, a ticket with the patient image on it could be part of a chart to be checked against a patient in a hospital before administering a prescribed procedure or surgery. The particular area a surgery is to be performed could be imaged and put into the patient chart to avoid for example, operations on the wrong side of the head or amputation of the wrong limb. Nurses could issue updated patient charts using a tablet at the patient bedside, taking a contemporaneous picture of the patient to print out on the patient chart. Further application can be had in the medical world and that of emergency first response teams who can log information into the display screen while using the imaging system associated with the handheld to send back data from the scene, including biometric data of an individual victim, for example. Use of Global Positioning Systems GPS in association with the handheld computing device would further enhance this and similar uses by automatically reporting an exact location in with the relevant content data and other bookkeeping data needed to coordinate efforts of the emergency team(s).

What would be appropriate responses to information determined based on matches of the biometric information provided at the scene with the database containing records with images or other biometric data can vary considerably depending on the intended use. If the first use as a ticket supplement is the use being made of the invention, the officer can be notified if the person being imaged (and/or matched against other biometric data) has outstanding arrest warrants by sending over the airwaves from the police car (or the tablet computer directly if it is appropriately equipped) the photographic data to a database of photographic data for matching against similar data for suspects and/or citizens that will exist in the police station (or at least be accessible through intermediate computer servers). The data the police person at the scene gets back from the office database(s) can be compared to the ID card. This comparison will expose the use of fakes. The comparison will also make available additional data to the policeman on the scene. Various other uses can be made of the information available in databases accessible to the police network, and appropriate responses to such data can be taken as needed. For example if the ID on the person does not match the photographic data taken at the scene, and the photographic data indicates that the person could be a violent criminal, the police person may request assistance for an arrest to be safely made.

DETAILED DESCRIPTION OF THE INVENTION

Referring first to FIG. 1 a typical scene 10 in which the invention can be used, depicts a police car 14 having pulled over a suspect's car 13 and the officer 11 in communication with the suspect 12 by the side of a road 50. Using a stylus 17, the police officer 11 may enter data onto the screen of the tablet computer 16's screen while the tablet computer camera 16*a* takes a photograph 19 of the suspect 12. Information including imaging information received from the camera 16*a* into the tablet 16 is transmitted over wireless communications antenna 16*b* to the police car through an antenna attached to police car 14. A computer 25 and printer 26 (both not shown) are in the police car 14 to receive data from the tablet computer and print the ticket.

In one embodiment, the police car computer 25 will automatically communicate with a computer back at the police station 20 which has access to an administrative database 23 DB1 and a suspect/citizen database 22 DB2. (If the tablet computer contains a wireless communication device such as is in a cell phone (not shown), it may contact the police station computer system directly). A communications device and antenna 21 facilitates this communication. The administrative database can log the violation information (and the biometric data and/or captured image from the scene if desired), and the biometric data and/or image and/or drivers license or other ID data can be checked against the suspect/citizen database to confirm the identity of the individual. The identity information can be used for various police purposes either at the scene or later.

A tablet computer capable of performing the functions illustrated here can be had commercially at the present time. For example, the ViewSonic View Pad 1000 contains a camera that is reversible so that the officer can point the camera at the suspect while he writes onto the display of the message pad computer with a stylus A handwriting recognition program is also currently available for such computers. These handwriting recognition products have been available since the time of the Apple Computer's Newton Message Pad, or earlier. The current preferred version at this moment is "PenOffice for Windows," a Miscrosoft Corporation product.

Clearly, other tablet computers that provide the functionality described herein would be ready substitutes for the ViewSonic device.

Figure 2:
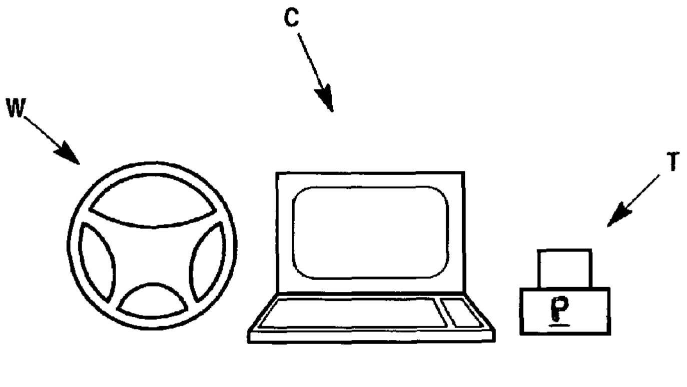
FIG. 2 illustrates some components useful for the invention found inside of a police car.

FIG. 2 illustrates the inside 29 of a police cruiser. Next to the wheel W of the police cruiser will generally sit a computer C and a printer P. From this Printer, in wireless communication with the computer tablet hand held by the officer from FIG. 1, a ticket T can be produced.

Figure 3:
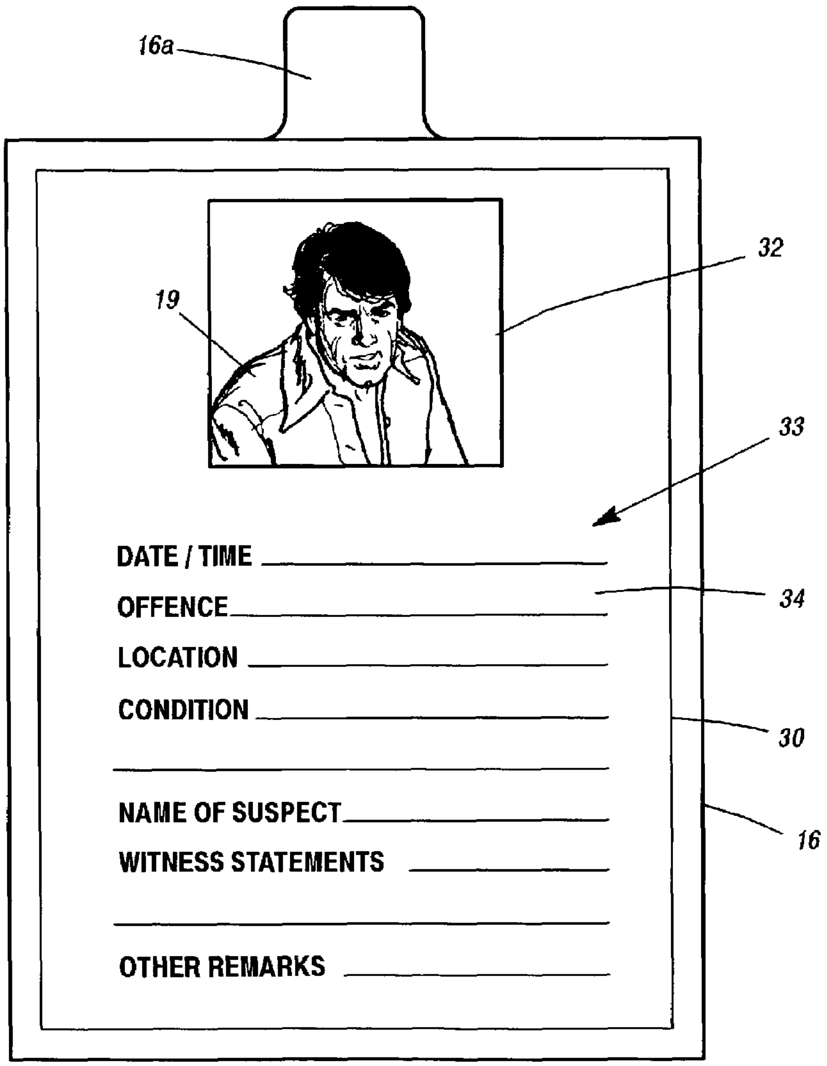
FIG. 3 illustrates a display of a mobile computing device used in accord with a preferred embodiment of this invention.

The information from the violation ticket being established in this preferred embodiment example should be provided contemporaneously to the back office computer database DB1 in order that the administrative functions and information useful for maintaining police operations can occur without the transfer of paper from the police officer's ticket booklet (which he will no longer have to carry) to the police station. In FIG. 3 the view the police officer will see of a typical ticketing screen 30 from the tablet computer is illustrated. The camera 16*a* points toward the suspect, which provides an image on the screen at area 32. The date and time can be requested to be filled in by the officer or it can automatically be filled in at area 33. (Use of a Global Positioning System (GPS) connected to the system and an on-board clock can provide such data automatically if desired. Time data can include date information from the on-board clock or from other available sources.) Offense, location, conditions, and the like, can all be filled in by the officer at the scene using the pen entry method preferably. (Data entry could be by keyboard or touch screen selections, or even voice recognition if preferred). By holding the stylus or pen to areas such as area 34 located next to the screen display area next to the displayed word "Offence".

It is also possible that the police officer can type the information in at the computer in his car after the photograph is taken of the subject and transmitted to the police cruiser's computer.

Figure 4:
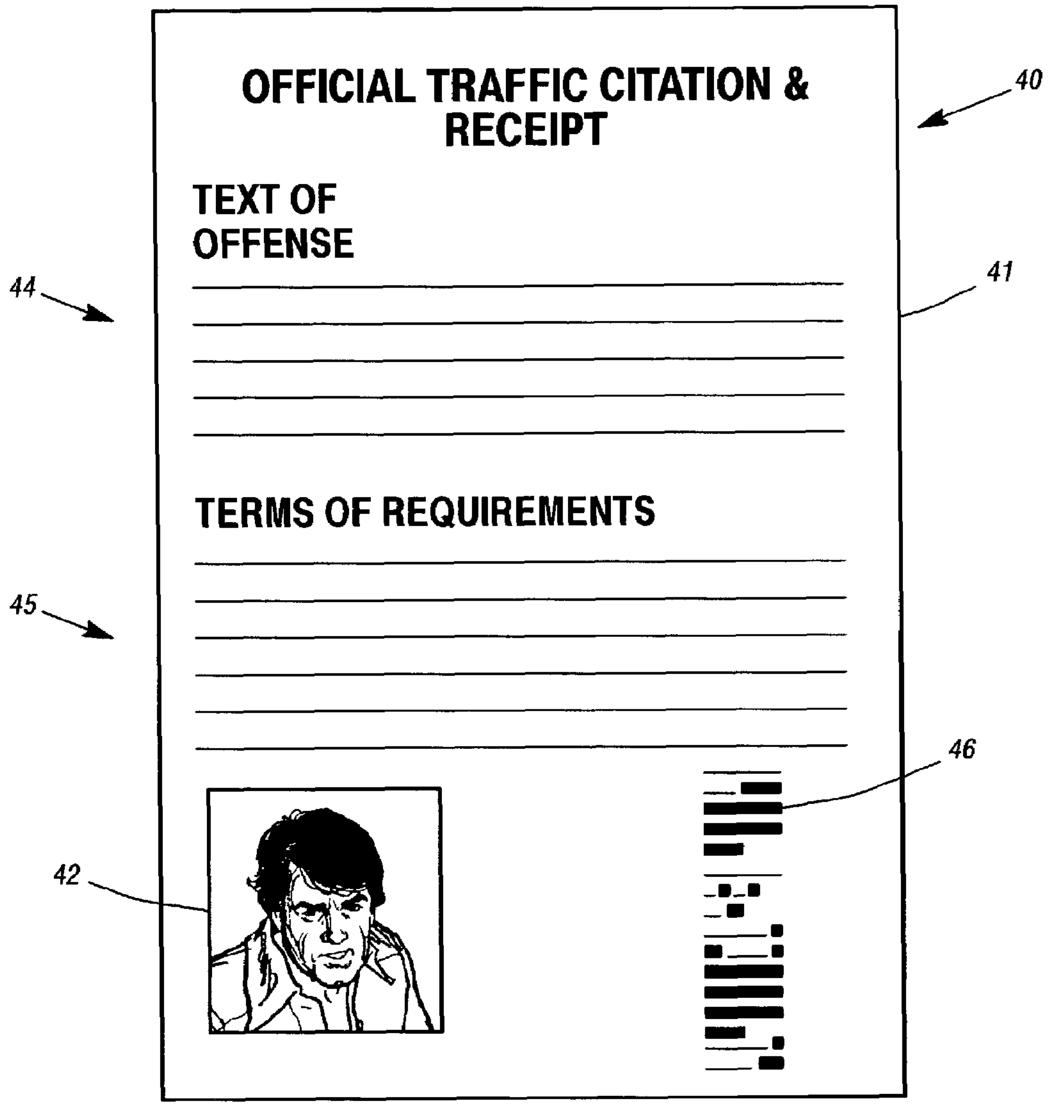
FIG. 4 illustrates a traffic citation document printed in accordance with a preferred embodiment of this invention.

It is also possible to include the printer as a fixture of the hand-held computer device and have that ticket printed immediately at the scene without the officer having to go back to his police cruiser to retrieve the ticket from a printer within the police cruiser, or if voice recognition is acceptable that form of data entry could be used also, or instead In FIG. 4 an official traffic citation and receipt 40 is illustrated. Typical terms of the TEXT OF OFFENSE and the TERMS AND REQUIREMENTS for satisfying the obligation to the authority 44 and 45 will be on the ticket 41. The inclusion of an image of the offender 42 printed preferably in color on the ticket itself provides a self-proving document, which prior to this invention was not available in so ready a form to the officer on patrol. It is also possible to encode (using a 2D bar code or other printable data storage technology) a scanable field 46 onto the ticket. In this way the ticket can not only be authenticated by looking at the image of the holder 42 but also by processing through a machine reader (not shown) the machine readable information in field 46. Data for this scanable field could come from an extract of the person's biometric data either taken from the person's imaging data or through an adjunct biometric reader (this could be a fingerprint, iris-scan, or the like, see U.S. Pat. No. 4,993,068 incorporated herein by this reference to provide some examples of some possible biometrics). Similarly, the data for a 2D scanable field on the ticket could be derived from data read using a magnetic, optical or other reader of the ID card or driver's license. Such machine readers can be in the police car, connected to or part of the tablet computer, or may be an additional device connected to the tablet computer, wirelessly if desired.

It should be recognized that if the police station's database (like DB 2, 22 in FIG. 1) or in the commercial situation or the medical situation, that information from the database which identifies the person who has been (or will shortly be) issued the document, the identification information will in all probability be of use to the person using the tablet computer. Accordingly, an information retrieval path is provided by which the office computer (which may be a server) in connection to the relevant database should be able to send data back through the same wireless pathway through which it received the biometric or image data. Thus, the data about the person being imaged or otherwise biometrically identified to the document can be displayed in an area on the display screen of the user's tablet computer. If preferred, this could be done inconspicuously so as to appear as text under a heading like OTHER REMARKS so as not to be obvious to the suspect, in the case of the police officer/suspect scene 10 illustrated in FIG. 1. It would also be preferred that the data sent in either direction be securely handled or encoded so that privacy and security concerns are reduced. Thus, encryption, spread spectrum, password protection and the like can be associated with the communications pathways and the data itself where appropriate.

Figure 5:
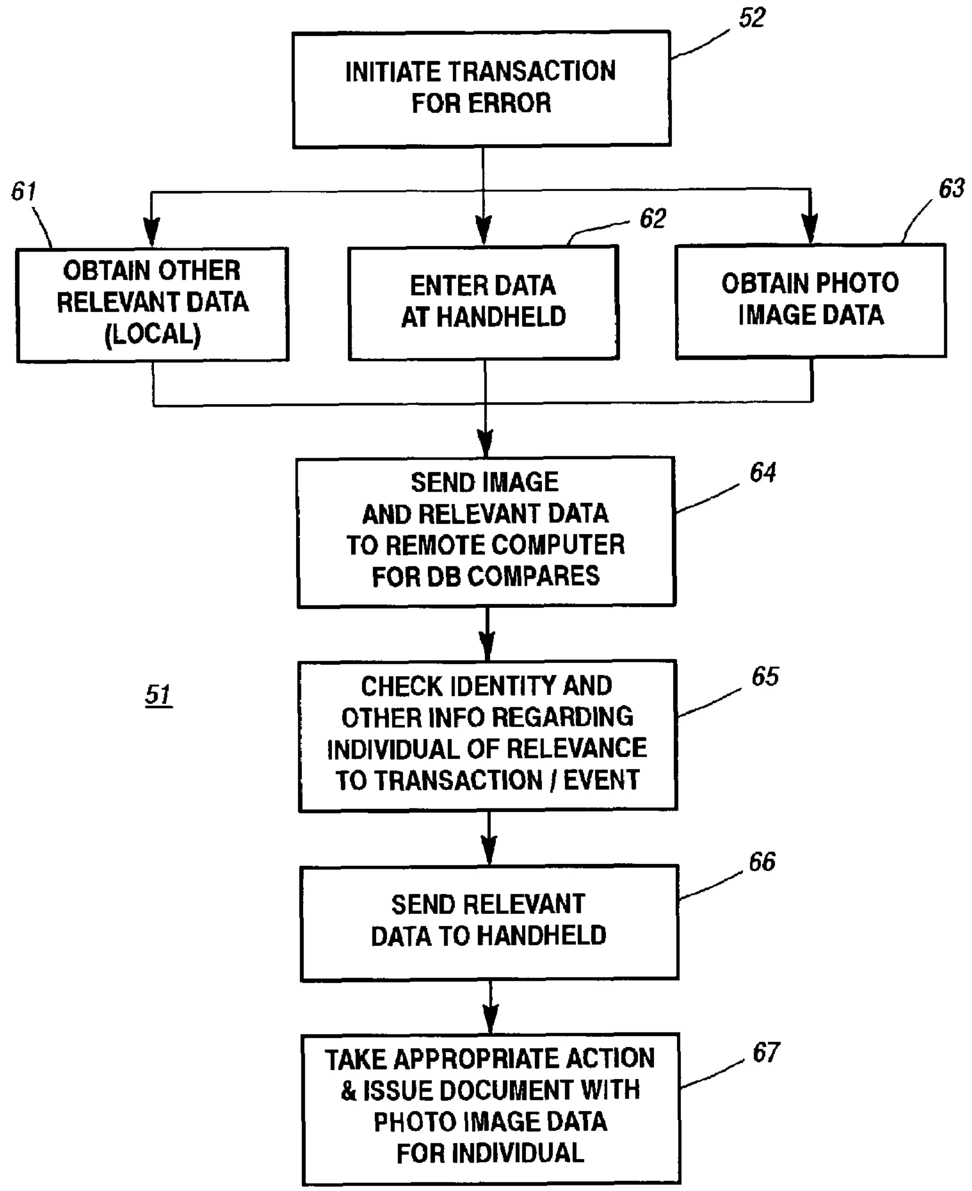
FIG. 5 is a flow chart.

The process will operate generally in accord with the flowchart 51 of FIG. 5. A transaction will be started 52 by the person using the handheld with the imaging camera on it. Data will be entered 62 into the handheld by that user in whatever form is appropriate (voice, stylus, etc.). A user can enter 61 additional relevant data from the scene, by using an ID reader, GPS, or just entering observations. The user will also capture 63 photo-image digital data using the camera associated with the handheld tablet computer For the particular system this is being applied to, and for the situational circumstances, certain elements of this collected information will be relevant to send 64 to remote computers for database comparisons and other purposes. Various forms of facial image data recognition systems exist today, and it is preferred that the one of greatest accuracy be used. Further, iris recognition data may also be extracted from the digital photo-image data and compared with extracted iris biometrics. Similar biometric checks will occur to the reader, which could provide suitable substitutes. For example, the police officer getting only image data regarding an uncooperative subject without an ID card may send the image data along with location data to the police system computers. These computers may or may not be able to identify the subject from the image data and can log-in the event using the location data (via a GPS reading or otherwise) and any other relevant data the officer has chosen to fill in on the display screen. The success of the match may depend on the system used, whether this person is in the database, and whether the biometric available for this person in the database is the same one as the one(s) send from the scene, for example. Further, an additional biometric may be captured through the use of a touch sensitive screen. For example, if the screen 33 is able to record a signature, that signature can be captured as well as printed out onto the document if desired. The moving pressure characteristics of the signature formed by the signer when making the actual signature can provide some additional identification features that are unavailable from an ordinary signature image. This too can be shared with the various databases in a manner similar to the digital image data and other biometrics to enhance the overall system validity characteristics.

The remote computer systems will check 65 the subject's identity and other information of relevance. For example, a doctor checking a patient in an exam room could find out about health information on the patient, all of which would have the reliability of having been checked against the image database of patients. This information would of course be sent back 66 to the display screen on the handheld for the user to employ 67 as needed.

It will be apparent that documents such as those which can be produced using this system may also be used for tickets of transit or admission and identification in various commercial or medical settings to support various transaction types too numerous to mention, as well as for traffic tickets. It should be recognized that documents can be electronic and that printable versions may not always be required to accomplish the same level of authentication and serviceability as described for the printable documents, and such document usage is within the scope of this invention as well. It will also be apparent that the kind of biometric authentication available through use of this invention has many applications and uses, some of which have been described or mentioned herewithin in sufficient detail to provide potential users with the ability to use this invention without undue experimentation.

Having described the invention in detail above, the applicant believes the invention is limited only by the following appended claims

What is claimed is:

1. An integrated tablet-computer system for producing a traffic ticket with a biometrically-relevant feature of a traffic-ticket recipient thereon, comprising:

a tablet computer, the tablet computer comprising a display;

a camera integrated with the tablet computer, the camera being pointed at a traffic ticket recipient while data is entered into the tablet computer display, the camera further obtaining the biometrically relevant feature of the traffic ticket recipient at a time and vicinity in which the traffic ticket is produced;

a program for automatically associating the biometrically-relevant feature of the traffic ticket recipient with the data and storing the biometrically-relevant feature and the data on the tablet computer; and, a printer, the printer being integrated with the tablet computer and printing a traffic ticket at the time and vicinity in which the traffic ticket is produced, the traffic ticket comprising the data and the obtained biometrically-relevant feature, wherein the biometrically-relevant feature includes an image of the traffic ticket recipient taken at the time and vicinity the traffic ticket is produced and an image of at least one eye of the traffic ticket recipient.

2. The tablet-computer system of claim 1, the scan of at least one eye of the traffic ticket recipient comprising a scan of the traffic ticket recipient's iris.

3. The tablet-computer system of claim 1, the biometrically-relevant feature being encoded on the traffic ticket.

4. The tablet-computer system of claim 3, the encoding comprising a scanable field.

5. The tablet-computer system of claim 4, the scanable field comprising a 2 dimensional barcode.

6. The tablet-computer system of claim 1, the reversible camera being removable from the tablet computer.

7. The tablet-computer system of claim 6, the reversible camera being in wireless communication with the tablet computer.

8. The tablet-computer system of claim 1, the display comprising a touch screen display.

9. The tablet-computer system of claim 1, the printer being removable from the tablet computer.

10. The tablet-computer system of claim 9, the printer being in wireless communication with the tablet computer.

11. The tablet-computer system of claim 1, the program further facilitating the capture of a signature provided by the traffic ticket recipient.

12. The tablet-computer system of claim 11, the program associating the captured signature with at least one of the biometrically-relevant feature and the data.

* * * * *